United States Patent
Lee et al.

(10) Patent No.: US 7,600,118 B2
(45) Date of Patent: Oct. 6, 2009

(54) METHOD AND APPARATUS FOR AUGMENTING AUTHENTICATION IN A CRYPTOGRAPHIC SYSTEM

(75) Inventors: David A. Lee, Portland, OR (US); Gary L Graunke, Hillsboro, OR (US); C. Brendan Traw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 907 days.

(21) Appl. No.: 10/256,803

(22) Filed: Sep. 27, 2002

(65) Prior Publication Data
US 2004/0064694 A1    Apr. 1, 2004

(51) Int. Cl.
*G06F 21/00*    (2006.01)
*H04L 9/00*    (2006.01)
*H04K 1/00*    (2006.01)

(52) U.S. Cl. .......................................... 713/168; 726/14
(58) Field of Classification Search ........................ None
See application file for complete search history.

(56) References Cited

U.S. PATENT DOCUMENTS

| | | | | |
|---|---|---|---|---|
| 6,058,476 A * | 5/2000 | Matsuzaki et al. | .......... | 713/169 |
| 6,263,437 B1 * | 7/2001 | Liao et al. | .................. | 713/169 |
| 6,507,907 B1 * | 1/2003 | Takahashi et al. | .......... | 713/150 |
| 6,539,479 B1 * | 3/2003 | Wu | ............................. | 713/151 |
| 6,550,008 B1 * | 4/2003 | Zhang et al. | ................. | 713/155 |
| 6,816,968 B1 * | 11/2004 | Walmsley | ................... | 713/168 |
| 6,820,201 B1 * | 11/2004 | Lincoln et al. | .............. | 713/179 |
| 6,845,450 B1 * | 1/2005 | Kobayashi et al. | ............. | 726/5 |
| 6,914,637 B1 * | 7/2005 | Wolf et al. | .................. | 348/473 |
| 6,976,177 B2 * | 12/2005 | Ahonen | ......................... | 726/3 |
| 7,117,363 B2 * | 10/2006 | Lincoln et al. | .............. | 713/175 |
| 7,131,004 B1 * | 10/2006 | Lyle | ........................... | 713/169 |
| 7,269,730 B2 * | 9/2007 | Stirbu | ......................... | 713/169 |
| 7,359,511 B2 * | 4/2008 | Matsuzaki et al. | ........... | 380/212 |
| 2002/0037081 A1 * | 3/2002 | Rogoff et al. | ............... | 380/278 |
| 2002/0112152 A1 * | 8/2002 | VanHeyningen et al. | .... | 713/151 |
| 2003/0012382 A1 * | 1/2003 | Ferchichi et al. | ............ | 380/270 |
| 2003/0145336 A1 * | 7/2003 | Matsuzaki et al. | .......... | 725/136 |

(Continued)

FOREIGN PATENT DOCUMENTS

WO    WO 2004/017417    4/2004

OTHER PUBLICATIONS

Menezes, Vanstone, Oorschot: "Handbook of Applied Cryptography", 1997, CRC Press LLC, USA XP002268714, pp. 385, 397-398, 403-404, 497, 506-508, 512, 515-516, and 524-525.

(Continued)

*Primary Examiner*—Christopher A Revak
(74) *Attorney, Agent, or Firm*—Blakely, Sokoloff, Taylor & Zafman LLP

(57) ABSTRACT

In a cryptographic system, a nonce is removed from a communication stream. The nonce is encrypted based on a shared secret. The encrypted nonce is inserted into the communication stream. The encrypted nonce is removed from the communication stream. The encrypted nonce is decrypted based on the shared secret formed by an authenticated key exchange. The decrypted nonce is inserted into the communication stream. The nonce may be an $A_n$ value generated by a HDCP function. The authenticated key exchange may use Diffie-Hellman Key Exchange.

30 Claims, 6 Drawing Sheets

U.S. PATENT DOCUMENTS

| | | | |
|---|---|---|---|
| 2003/0158960 A1* | 8/2003 | Engberg | 709/237 |
| 2003/0200433 A1* | 10/2003 | Stirbu | 713/169 |
| 2003/0226029 A1* | 12/2003 | Porter et al. | 713/200 |
| 2004/0039927 A1* | 2/2004 | Hazama et al. | 713/189 |
| 2005/0289343 A1* | 12/2005 | Tahan | 713/169 |
| 2007/0011455 A1* | 1/2007 | Lincoln et al. | 713/170 |
| 2007/0083753 A1* | 4/2007 | Lincoln et al. | 713/156 |

OTHER PUBLICATIONS

Search Report for PCT/US03/30056; mailed Feb. 18, 2004; 1 page.

Asthana, Shriman, 1082/DELNP/2005 First Examination Report, Jul. 31, 2006, 2 pages, New Delhi, India.

Ayaz, Sheikh, PCT/US03/30056 International Preliminary Examination Report, Jun. 2, 2004, 3 pages, International Preliminary Examining Authority/ United States, Alexandria, Virginia.

Lehmann, Ing., 10393259.3 Office Action, Feb. 23, 2009, 12 pages, Munich, Germany.

092124210 Official Notification of the Intellectual Property Office, May 10, 2005, 1 page, Taiwan.

Wellings, Joseph, GB0502951.7 Examination Report, Jun. 24, 2005, 1 page, South Wales, United Kingdom.

Xiao, Dong, 03822779.7 The First Office Action, Oct. 24, 2008, 18 pages, Beijing, China.

High-bandwith Digital Content Protection System, Feb. 17, 2000, 60 pages, Intel Developer Forum, Hillsboro, Oregon, United States.

* cited by examiner

METHOD AND APPARATUS FOR AUGMENTING AUTHENTICATION IN A CRYPTOGRAPHIC SYSTEM

FIELD OF THE INVENTION

The invention relates to the field of cryptography. More specifically, the invention relates to enhancing the authentication protocol of a cryptographic system.

BACKGROUND OF THE INVENTION

The exchange of data, particularly audiovisual media, between devices that use or express that data, is commonplace. The data itself may be the product of a considerable investment of time and money. To protect this investment, distributors of such data often charge a price for the distribution of the data to those interested in obtaining it. However, if the channels over which the data is distributed are insecure, then others may receive the data without paying the price. This prevents those involved with the production or distribution of the data from recapturing the costs of their efforts.

In order to increase the security of the channels through which such data is transmitted, cryptographic systems may be employed. These cryptographic systems encrypt the data prior to its transmission over a communication stream to another device. Upon reaching the intended device, the data may be decrypted into its original, usable form. While encrypted, the data are not in a usable form. Those who do not possess the ability to decrypt the data are therefore unable to use the data. Therefore, cryptographic systems are designed to provide a level of assurance that the data can only be decrypted by those intended to have the ability to do so.

Various cryptographic systems exist. One such cryptographic system is High-bandwidth Digital Content Protection System ("HDCP"). The HDCP specification is well known in the art and therefore need not be described in detail herein. Briefly, HDCP is designed to protect video transmission between a Digital Visual Interface ("DVI") transmitter and a DVI receiver. The DVI specification is well known in the art and therefore need not be described in detail herein. HDCP employs an authentication protocol through which a DVI transmitter verifies that a given DVI receiver is licensed to receive protected data. Then, when the legitimacy of the receiver is determined, encrypted data is transmitted between the two devices based on shared secrets established during the authentication protocol. Therefore, a transmission device may be seen as having an encryption unit (or layer) to encrypt the data, and a reception device may be seen as having a corresponding decryption unit (or layer) to decrypt that data.

Some cryptographic systems, such as HDCP, provide a certain level of cryptographic assurance, or security, at a cost that makes it financially feasible to use in many circumstances. For example, HDCP may utilize a key distribution cryptography system, which is generally known in the art to provide only a certain level of security, but at a lesser implementation cost. Other circumstances, however, may require a higher level of cryptographic assurance, or security, such as provided by a public key cryptographic, which is generally understood to provide a higher level of security, but at a higher implementation cost. Unfortunately, persons who have invested in a cryptography system such as a key distribution based HDCP system can currently only upgrade to a higher-level security system, such as a public key system, by abandoning the old system and entirely replacing it with a new system. This leads to undue implementation and maintenance costs.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. However, element numbers are the same for those elements that are the same across different Figures.

DETAILED DESCRIPTION OF THE INVENTION

In the following description, numerous specific details are set forth to provide a thorough understanding of embodiments of the invention. However, it is understood that embodiments of the invention may be practiced without these specific details. In other instances, well-known circuits, structures and techniques have not been shown in detail in order not to obscure embodiments of the invention.

Described herein is a method and apparatus for enhancing an authentication unit in an already existing cryptographic system to include an additional layer of cryptography, thus producing an augmented authentication unit that may provide an additional tier of security. An advantage of the augmented authentication unit is that the already existing cryptographic system can be enhanced instead of replaced, thus allowing for enhanced cryptographic security with minimal cost. Another advantage is that the pre-augmented authentication unit may function according to one cryptographic method while the augmented authentication unit may function according to a different cryptographic method, but both may function exclusive of the other. Thus, the security system may still function at its original one-tier level of security, or it may function according to an enhanced two-tier level of security.

Figure 1:
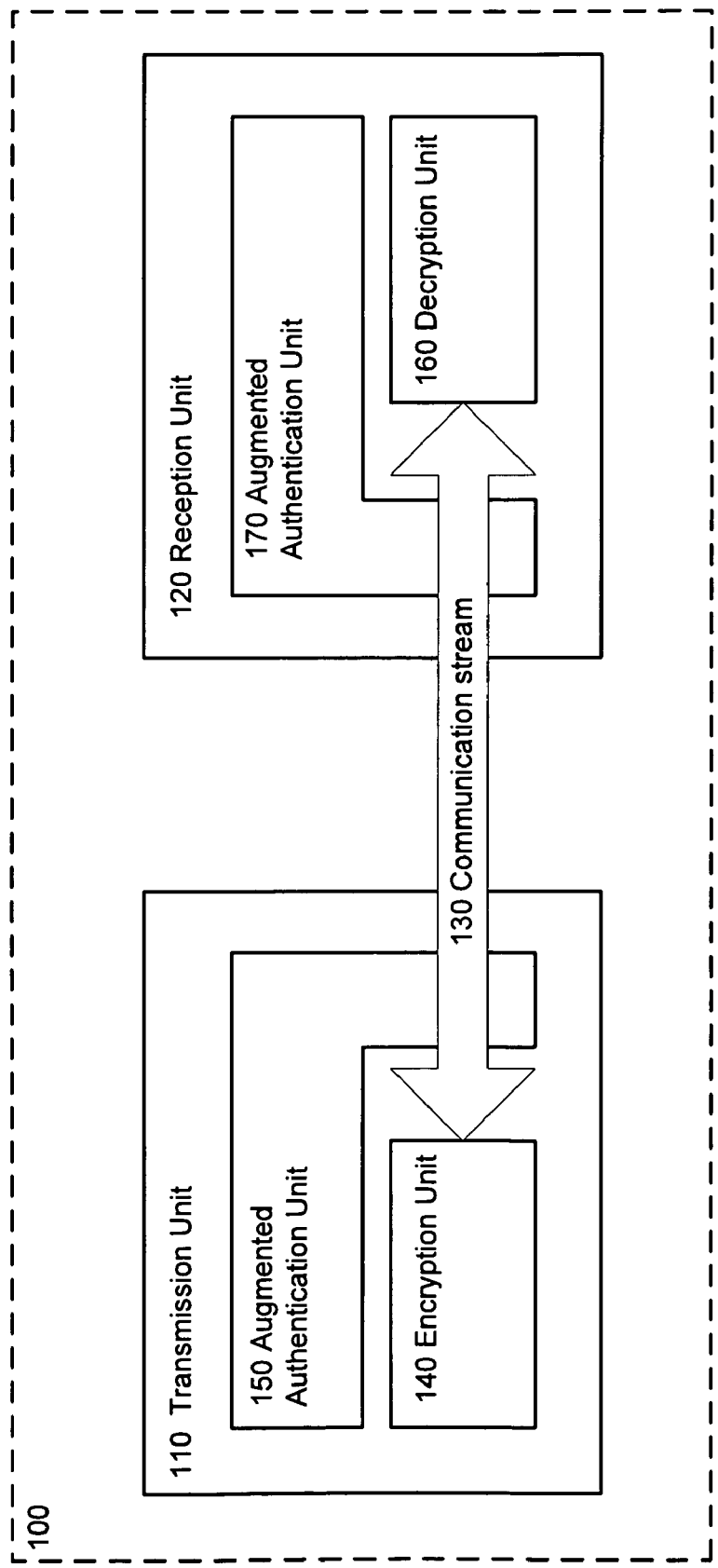
FIG.1 shows a block diagram illustrating an apparatus for augmenting authentication in a cryptographic system according to one embodiment of the invention.

FIG.1 shows a block diagram illustrating an enhanced cryptographic apparatus 100 for augmenting authentication in a cryptographic system, according to one embodiment. Transmission unit 110 is connected to reception unit 120 through communication stream 130. Transmission unit 110 includes encryption unit 140 and augmented authentication unit 150. Encryption unit 140 is connected to augmented authentication unit 150 through communication stream 130. Reception unit 120 includes decryption unit 160 and augmented authentication unit 170. Decryption unit 160 is connected to augmented authentication unit 170 through communication steam 130. Encryption unit 140 is connected to decryption unit 160 through communication stream 130. Augmented authentication unit 150 is connected to augmented authentication unit 170 through communication stream 130. While the foregoing units are described as units and may be implemented in hardware, it is apparent that one or more of these units may constitute layers of communication protocol implemented in software.

In one embodiment, transmission unit 110 is a DVI video transmitter. In one embodiment, reception unit 120 is a DVI video receiver. In one embodiment, transmission unit 110 is a DVI video repeater. In one embodiment, reception unit 120 is a DVI video repeater. In one embodiment, communication stream 130 is an Inter-Integrated Circuit ("I²C") bus. The I²C specification is well known in the art and therefore need not be described in detail herein. In one embodiment, encryption unit 140 is a HDCP transmitter. In one embodiment, decryption unit 160 is a HDCP receiver.

In one embodiment, augmented authentication units 150 and 170 are added to transmission unit 110 and reception unit 120, respectively, without altering the existing hardware of encryption unit 140 and decryption unit 160. In one embodiment, encryption unit 140 and decryption unit 160 operate independently of augmented authentication units 150 and 170.

By enhancing the HDCP system as described herein, a higher level of cryptographic assurance, or security, can be provided than is provided by HDCP alone, while beneficially reusing existing relatively low-cost HDCP systems.

Figure 2:
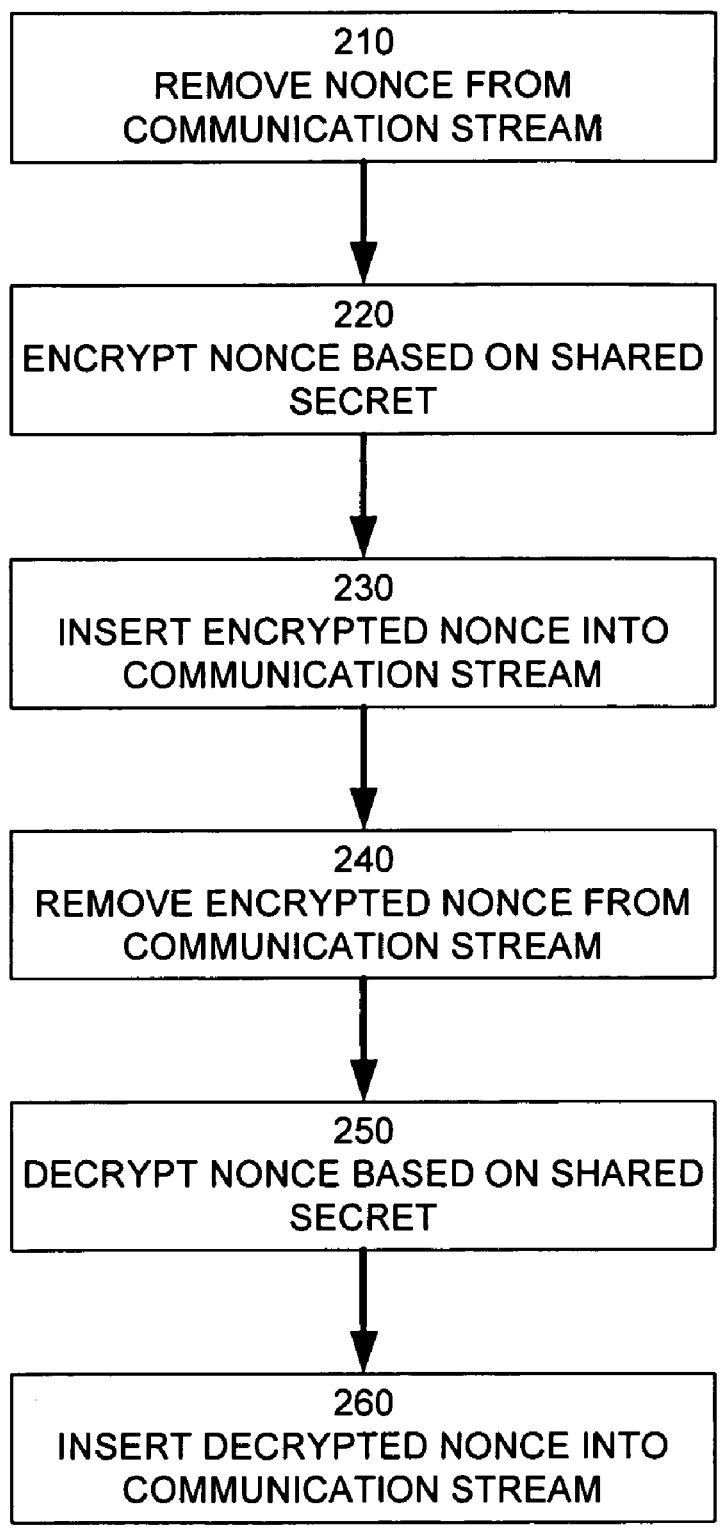
FIG.2 shows a flow diagram illustrating a process for augmenting authentication in a cryptographic system according to one embodiment of the invention.

FIG.2 shows a flow diagram illustrating a process for augmenting authentication in a cryptographic system, according to one embodiment. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

In processing block 210, a nonce is removed from a communication stream. A nonce is any random value used in an authentication exchange phase of a cryptographic system. For example, after encryption unit 140 inserts the nonce into communication stream 130 during the authentication exchange phase of a cryptographic system, augmented authentication unit 150 intercepts the nonce and removes the nonce from communication stream 130.

In one embodiment of the invention, the nonce is an $A_n$ value generated by a HDCP function. A description of the $A_n$ value can be found with reference to the HDCP specification. Briefly, the $A_n$ value is a 64-bit pseudo random value that is generated by the HDCP Cipher function hdcpRngCipher and is contained in an initiation message sent from an HDCP transmitter to an HDCP receiver during the HDCP authentication exchange.

In processing block 220, the nonce is encrypted based on a shared secret. The concept of a shared secret in public-key cryptography systems is well known in the art and therefore need not be described in detail herein. For example, augmented authentication unit 150 and augmented authentication unit 170 perform an authenticated key exchange. A shared secret (between authentication unit 150 and authentication unit 170) is formed by this authenticated key exchange. This shared secret is not to be confused with a shared secret formed during an exchange between encryption unit 140 and decryption unit 160; the latter is used to encrypt and decrypt the data transmitted between encryption unit 140 and decryption unit 160, while the former is used to encrypt the nonce used in authentication between encryption unit 140 and decryption unit 160 prior to such data encryption and decryption. Through this authenticated key exchange, a higher level of cryptographic assurance, or security, is provided than that provided by HDCP alone. Continuing the example, augmented authentication unit 150 then encrypts the nonce based on the shared secret. Various techniques for encryption and decryption are well known in the art therefore need not be described in detail herein.

In one embodiment, the authenticated key exchange, on which the shared secret is based, uses a signed Diffie-Hellman Key Exchange and returns a digital certificate in the authenticated key exchange. Signed Diffie-Hellman Key Exchange is well known in the art and therefore need not be described in detail herein. In one embodiment, the nonce is encrypted using the Rivest Shamir Adleman ("RSA") algorithm. The RSA algorithm is well known in the art and therefore need not be described in detail herein, although some details may be included in the detailed description below.

In processing block 230, the encrypted nonce is inserted into the communication stream. For example, augmented authentication unit 150 inserts the encrypted nonce into communication stream 130. The encrypted nonce effectively replaces the nonce intercepted by augmented authentication unit 150 in communication stream 130.

In processing block 240, the encrypted nonce is removed from the communication stream. For example, augmented authentication unit 170 intercepts the encrypted nonce and removes the encrypted nonce from communication stream 130.

In processing block 250, the encrypted nonce is decrypted based on the shared secret. For example, augmented authentication unit 170 decrypts the encrypted nonce. The result of the decryption is the nonce originally inserted into the communication stream by encryption unit 140. The decrypted nonce effectively replaces the encrypted nonce intercepted by augmented authentication unit 170 in communication stream 130.

In processing block 260, the decrypted nonce is inserted into the communication stream. For example, augmented authentication unit 170 inserts the decrypted nonce into communication stream 130. The nonce would then be received by decryption unit 160 during the authentication exchange phase of a cryptographic system. The nonce may be used by decryption unit 160 to complete the authentication exchange with encryption unit 140.

Figure 3:
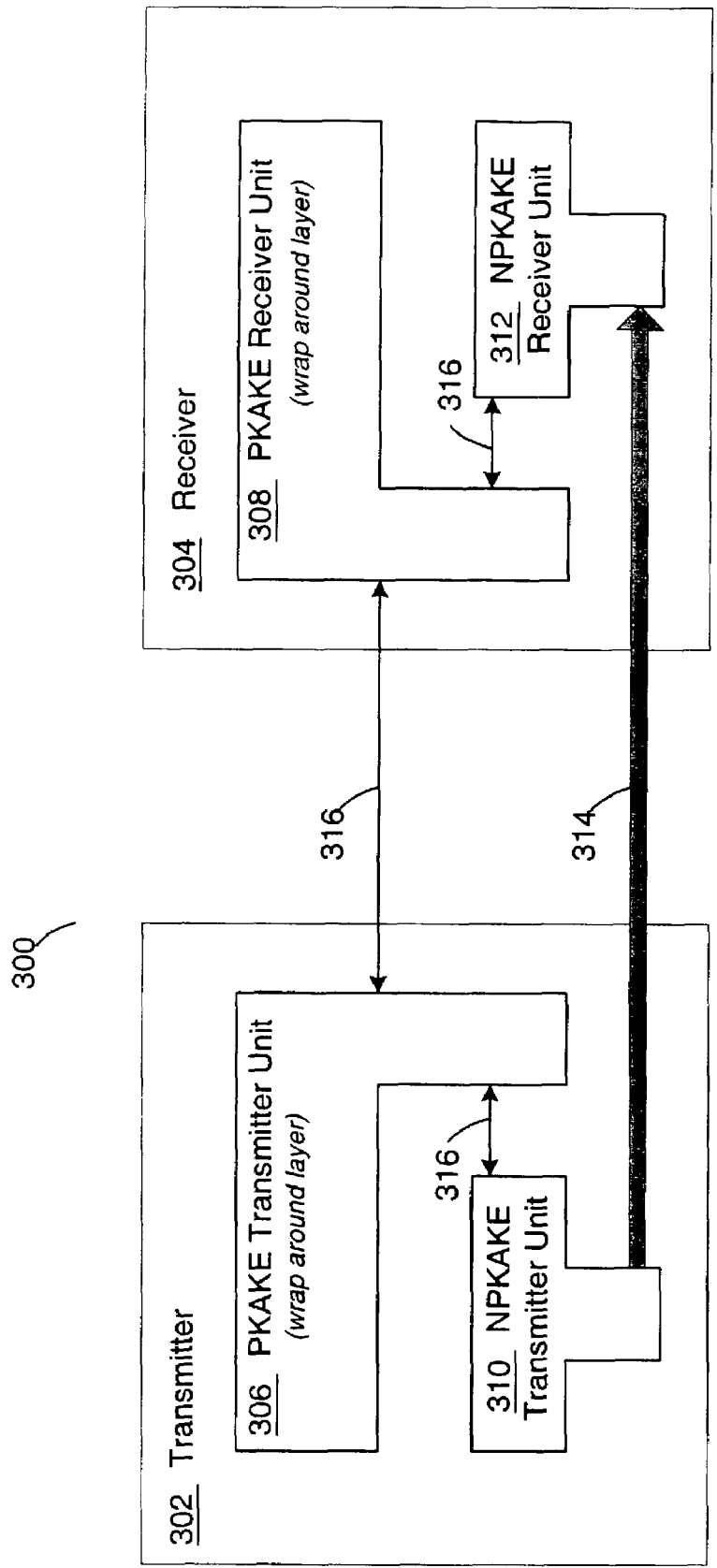
FIG.3 illustrates an enhanced encryption apparatus according to one embodiment of the invention.

FIG.3 illustrates an enhanced encryption apparatus 300 according to one embodiment of the invention. Referring to FIG. 3, a transmitter device 302 is to transmit encrypted data to a receiver device 304. The transmitter device 302 includes a pre-existing transmitter unit 310 that follows a certain encryption protocol that does not utilize a public key during authentication or key exchange, or in other words the protocol is a non-public-key authentication and key exchange protocol, or NPKAKE protocol. Therefore, in the embodiment of the invention shown in FIG. 3, the pre-existing transmitter unit 310 may be referred to as a "NPKAKE Transmitter Unit 310". The transmitter device 302 also includes an augmented authentication unit 306 that is to provide a public key authenticated key exchange, or PKAKE, to the NPKAKE Transmitter Unit 310. The, augmented authentication unit 306 wraps around the NPKAKE Transmitter Unit 310 and enhances the NPKAKE protocol to the level of security of a PKAKE protocol. Therefore, in the embodiment of the invention shown in FIG. 3, the augmented authentication unit 306 will be referred to as a "PKAKE Transmitter Unit 306". Likewise, the receiver device 304 includes a pre-existing decryption unit 312 that follows a NPKAKE protocol and an augmented authentication unit 308 to wrap around the pre-existing decryption unit 312 to provide PKAKE level authentication and security. Consequently, in the embodiment shown in FIG. 3, the pre-existing decryption unit 312 will be referred to as a "NPKAKE Receiver Unit 312" and the augmented authentication unit 308 a "PKAKE Receiver Unit 308". As mentioned previously, the PKAKE units 306 and 308 wrap around the NPKAKE units 310 and 312. Herein, the term "wrap around" is a figurative phrase which means that the PKAKE units 306 and 308 integrate with the authentication and key exchange portions of the NPKAKE units 310 and 312 and provide enhanced authentication. A method describing the wrap around is described in further detail in conjunction with FIG. 4 below.

Still referring to FIG. 3, the transmitter device 302 is to transmit data, such as Digital Visual Interface (DVI) data, to the receiver device 304 via a data channel 314. The data needs to be encrypted by the NPKAKE Transmitter Unit 310 before being communicated to the NPKAKE Receiver Unit 312 in the receiver device 304. Once transmitted to the receiver device 304 the encrypted data needs to be decrypted by the NPKAKE Receiver Unit 312. The cryptographic process as a whole, however, requires more than just encryption and decryption of data. As is well understood in the art, encryption and decryption of data is useless unless the encrypting device can communicate with the decrypting device and verify the decrypting devices true identity, more commonly known as "authentication". In addition, the encryption/decryption process encrypts data that can only be decrypted with a key that the encrypting device shares with the decrypting device. As part of the decryption process, the decrypting device and encrypting device need to actually agree with each other about keys ("key exchange").

In the embodiment of the invention shown in FIG. 3, the NPKAKE Transmitter Unit 310 and NPKAKE Receiver Unit 312 have authentication, key exchange, and encryption/decryption capabilities that are performed via communication paths 316, such as $I^2C$ communication paths. However, the authentication and key exchange capabilities of the NPKAKE Transmitter Unit 310 and NPKAKE Receiver Unit 312 may be based on a cryptographic method that can only provide a certain level of protection. For example, the NPKAKE Transmitter Unit 310 and NPKAKE Receiver Unit 312 may utilize a symmetric key system or a key distribution system, both well known in the art, whereby a central administrator creates keys then distributes the keys to certain members of a group. The group members do not participate in the creation of the keys and have no private secrets necessary for the proper function of the keys. The keys themselves are the only form of security. During the authentication and key exchange processes, therefore, a group member utilizes a distributed key, or keys, which the NPKAKE Transmitter Unit 310 and NPKAKE Receiver Unit 312 can authenticate and agree on. However, since the members of the group have no say in the creation of the keys, and since they have no private secrets for the proper function of the keys, if a user outside the group were to obtain possession of a key, or keys, then the outside user could encrypt and decrypt data without permission. Thus, although the NPKAKE Transmitter Unit 310 and NPKAKE Receiver Unit 312 have a certain level of security, it has certain limitations. In one embodiment of the invention, the NPKAKE units 310 and 312 follow the HDCP protocol, as described herein, which utilizes a key distribution protocol.

Other types of cryptographic systems exist, however, than can provide a higher level of security. One such system a public key system. In a public key system, a user can participate in the creation of the key and hold part of the key secret while sharing another portion of the key with a participating user. A public key system is more secure because even if an outside user were to obtain the shared part of the key, the secret part is still secret and doesn't ever have to be known by anyone other than the creating user. Public key systems, therefore, provide a higher level of security than symmetric key or distributed key systems, though public key systems are often more costly to implement and maintain. In addition, until now, pre-existing symmetric key or key distribution systems had no way of utilizing the higher security of a public key system. The pre-existing system would have to be entirely replaced by a new public-key system, leading to undue time and money costs. An advantage of the encryption apparatus 300, however, is that the PKAKE units 306 and 308 can enhance the security of the NPKAKE units 310 and 312 that use a lower level of security, such as that provided by a symmetric key or key distribution system, with a higher level of security, such as that provided by a public key system. The PKAKE units 306 and 308 do this by providing public key authentication and key exchange before the NPKAKE units 310 and 312 perform the symmetric key or key distribution authentication and key exchange. During the public key authenticated key exchange, the PKAKE units 306 and 308 derive a shared secret value. Once the PKAKE units 306 and 308 have derived the shared secret value via the public key authenticated key exchange, then the NPKAKE units 310 and 312 can perform their authentication and key exchange functions. A method describing how the PKAKE units 306 and 308 enhance the NPKAKE units 310 and 312 is described in further detail in conjunction with FIG. 4 below.

Figure 4:
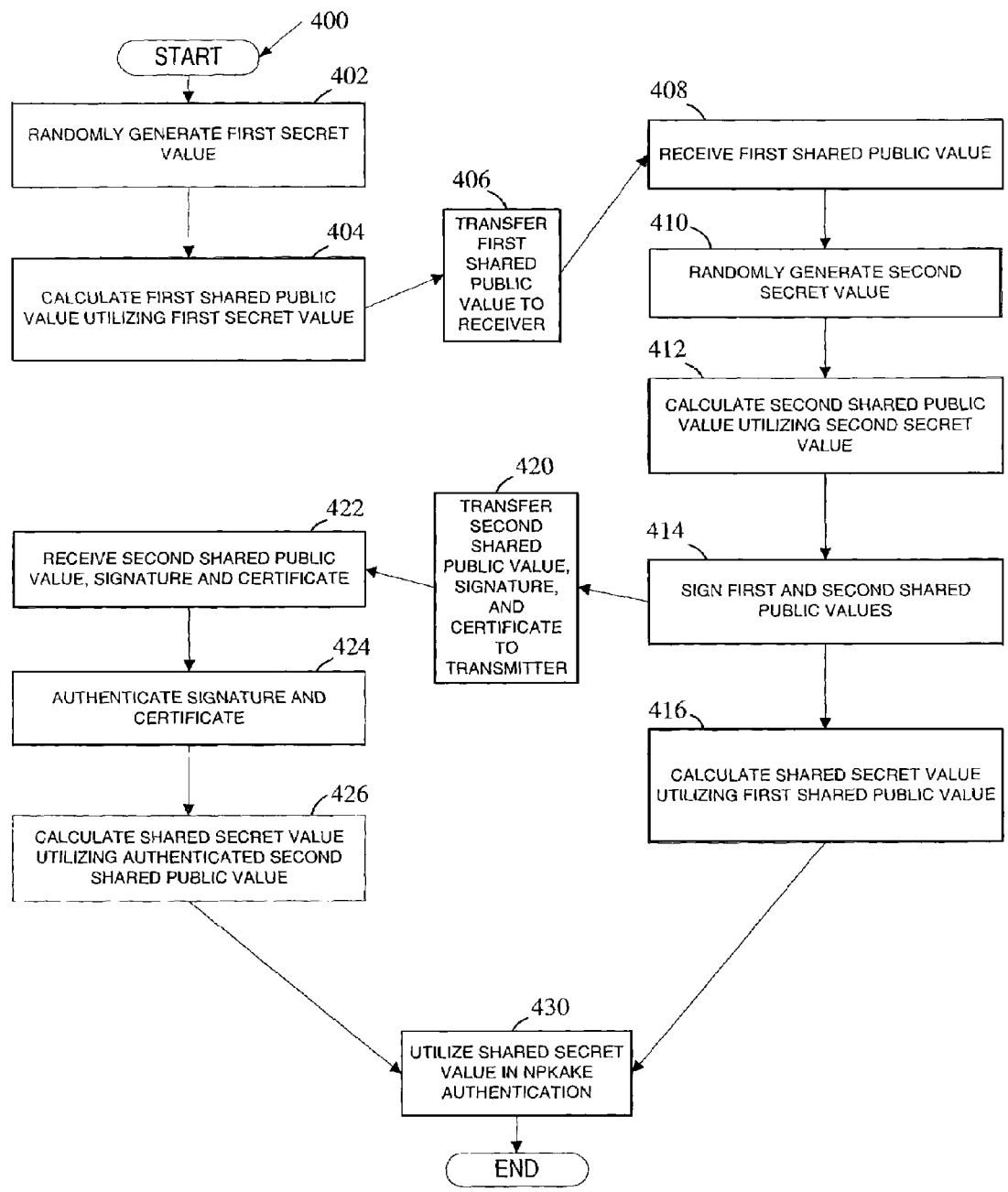
FIG.4 is a flow chart diagram describing a method according to one embodiment of the invention.

FIG. 4 is a flow chart diagram indicating a method 400 for wrapping the PKAKE units 306 and 308 around the NPKAKE units 310 and 312. The method shown in FIG. 4 utilizes an authenticated Diffie-Hellman key exchange algorithm, although one ordinarily skilled in the art may recognize that other public key based algorithms may be utilized in place of the Diffie-Hellman algorithm. Referring to FIG. 4, as shown at processing block 402, the PKAKE Transmitter Unit 306 randomly generates a first secret value ($X_a$). This value is not to be shared with any other units external to the transmitter device 302. Once the first secret value ($X_a$) is generated, as shown in processing block 404, the PKAKE Transmitter Unit 306 utilizes the first secret value ($X_a$) to calculate a first shared public value ($Y_a$) according to a Diffie-Hellman algorithm ($Y_a = g^{Xa}$ mod p, where g and p are public system parameters known to both the PKAKE Transmitter Unit 306 and the PKAKE Receiver Unit 308.) Once the first shared public value ($Y_a$) is calculated, the PKAKE Transmitter Unit 306 transmits the first shared public value ($Y_a$) to the PKAKE Receiver Unit 308, as shown at processing block 406. The PKAKE Receiver Unit 308 receives the first shared public value ($Y_a$) as shown at processing block 408, and the PKAKE Receiver Unit 308 randomly generates a second secret value ($X_b$), shown at processing block 410. Although method 400 shows that the PKAKE Receiver Unit 308 generates the second secret value ($X_b$) (at block 410) after receiving the first shared value ($Y_a$) (at block 408), in alternate embodiments of the invention, the PKAKE Receiver Unit 308 may generate the second secret value ($X_b$) before any of the methodology described in any of the preceding processing blocks 402-408. Next, as shown at processing block 412, the PKAKE Receiver Unit 308 utilizes the second secret value ($X_b$) to calculate a second shared public value ($Y_b$) according to a Diffie-Hellman algorithm ($Y_b = g^{Xb}$ mod p).

Next, as shown at processing blocks 414 the PKAKE Receiver Unit 308 uses a device-specific private key to sign the first and second shared public values. In one embodiment of the invention, the PKAKE Receiver Unit 308 concatenates the first and second shared public values ("the concatenated values") together and signs the concatenated values. The PKAKE Receiver Unit 308 may utilize the RSA algorithm to sign the concatenated values. The RSA algorithm includes utilizing an encrypted private key and an encrypted public key. The public key is included in a certificate that has been signed by a central Licensing Administrator ($B_{cert}$). Then, as shown at processing block 420, the PKAKE Receiver Unit 308 transfers the signed concatenated values, the second shared public value ($Y_b$), and the certificate ($B_{cert}$) to the PKAKE Transmitter Unit 306, which, as shown at processing block 422, the PKAKE Transmitter Unit 306 receives. More methodology concerning the PKAKE Transmitter Unit 306 will follow further below. In addition, as shown at processing block 416, the PKAKE Receiver Unit 308 utilizes the first shared public value ($Y_a$) and the second secret value ($X_b$) to calculate a first shared secret value ($X_{ab}$) according to the Diffie-Hellman algorithm ($X_{ab}=Y_a^{Xb}$ mod p).

Returning now to processing block 422, after the PKAKE Transmitter Unit 306 receives the signed concatenated values, the second shared public value ($Y_b$), and the certificate ($B_{cert}$), at processing block 424, the PKAKE Transmitter Unit 306 verifies, or authenticates, the concatenated values utilizing the public key and the certificate ($B_{cert}$) and compares the portion of the authenticated concatenated values corresponding to the second shared value with the received second shared value ($Y_b$). If they agree, then, as shown at processing block 426, the PKAKE Transmitter Unit 306 utilizes the authenticated second shared public value and the first secret value ($X_a$) to calculate a second shared secret value ($X_{ba}$) equivalent in value to the first shared secret value ($X_{ab}$) according to the Diffie-Hellman algorithm ($X_{ba}=Y_b^{Xa}$ mod p). Finally, as shown at processing block 430, the NPKAKE Transmitter Unit 310 and the NPKAKE Receiver Unit 312 integrate the equivalent shared secret value ($X_{ab}=X_{ba}$) into the NPKAKE authentication process.

According to one embodiment of the invention, mentioned above, the equivalent shared secret value may operate on a nonce value within the NPKAKE authentication protocol. In one embodiment of the invention, NPKAKE protocol may be the HDCP protocol. The HDCP protocol utilizes a nonce value ($A_n$) within its authentication process for encrypting exchanged keys. Since the HDCP protocol is a NPKAKE protocol, the nonce value ($A_n$) is derived by a lower level of security. However, once the shared secret value is derived according to the method described in FIG. 4, then the shared secret value can replace, or in some other way operate upon, the nonce value ($A_n$). For example, in one embodiment of the invention, the shared secret value may operate on the HDCP nonce value ($A_n$) via one-time pad encryption, which utilizes an exclusive-OR operation.

In addition, depending on what kind of NPKAKE protocol is utilized, the entire shared secret value may not be necessary, but an abbreviated version of the shared secret value may. For example, if the nonce value ($A_n$) of the HDCP authentication is a 64-bit value, then the PKAKE Transmitter Unit 306 may abbreviate the shared secret value to the first 64 bits and transfer only that portion of the second shared secret value to the NPKAKE Transmitter Unit 310 for use in HDCP authentication. Likewise, the PKAKE Receiver Unit 308 may abbreviate the first shared secret value to the first 64 bits and transfer only that portion of the first shared secret value to the NPKAKE Receiver Unit 312 for use in HDCP authentication. If other versions of HDCP utilize a nonce value other than 64 bits, the PKAKE units 306 and 308 may instead abbreviate the equivalent shared secret values to the necessary number of bits.

Figure 5:
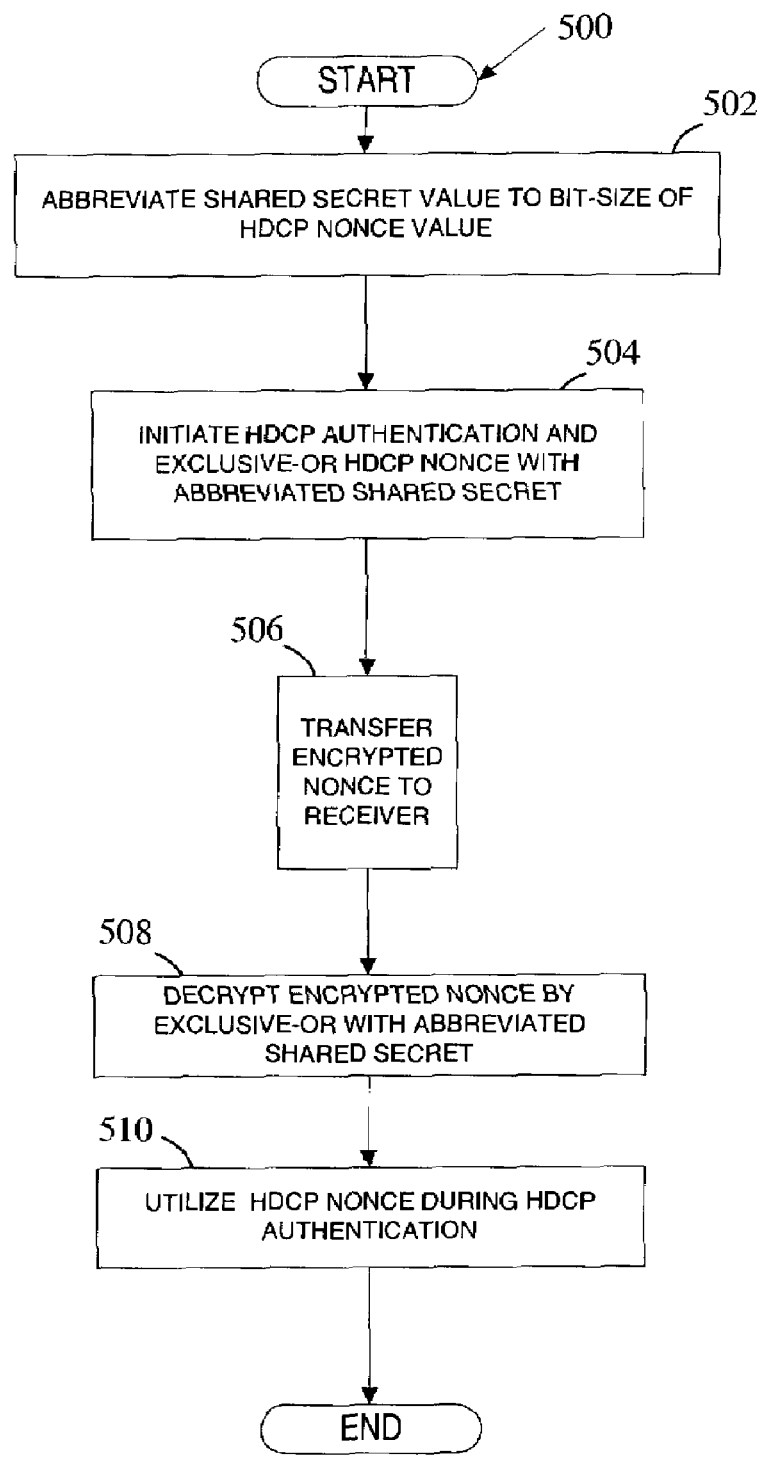
FIG.5 is a flow chart diagram describing a method according to one embodiment of the invention.

FIG. 5 is a flow diagram describing a method 500 of integrating the shared secret value into an HDCP authentication protocol. Referring to FIG. 5, the method begins as processing block 502 with the PKAKE units 306 and 308 abbreviating the shared secret value to the bit-size of the HDCP nonce value ($A_n$). For example, the PKAKE units 310 and 312 may be programmed to recognize that the NPKAKE units 310 and 312 will utilize an HDCP protocol having a 64-bit nonce. Consequently, the PKAKE units 310 and 312 would abbreviate the shared secret value to the first 64 bits to create an abbreviated shared secret value ($A_m$). Then, as shown at processing block 504, when the NPKAKE Transmitter Unit 310 begins authentication, the PKAKE Transmitter Unit 306 intercepts the nonce ($A_n$) and exclusive-ORs the HDCP nonce ($A_n$) with the abbreviated shared secret ($A_m$) to create an encrypted nonce ($A_{mn}$). Next, as shown at processing block 506, the PKAKE Transmitter Unit 306 transfers the encrypted nonce ($A_{mn}$) to the receiver device 304 and the PKAKE Receiver Unit 308 intercepts the encrypted nonce ($A_{mn}$). Then, as shown at processing block 508, the PKAKE Receiver Unit 308 decrypts the encrypted nonce ($A_{mn}$) by exclusive-ORing it with the abbreviated shared secret value ($A_m$) to derive the original HDCP nonce value ($A_n$). Then, as shown at processing block 510, once the original nonce value ($A_n$n) is derived, the PKAKE Receiver Unit 308 then transfers the nonce ($A_n$) to the NPKAKE Receiver Unit 312 and utilizes the nonce ($A_n$) during authentication.

Thus, at least one embodiment of the invention has been described where a PKAKE protocol was utilized in conjunction with a NPKAKE to enhance the security of the NPKAKE protocol. However, it is just as feasible, in other embodiments of the invention, to utilize a PKAKE protocol to wrap around a legacy PKAKE protocol to provides extra security for the legacy PKAKE protocol.

Figure 6:
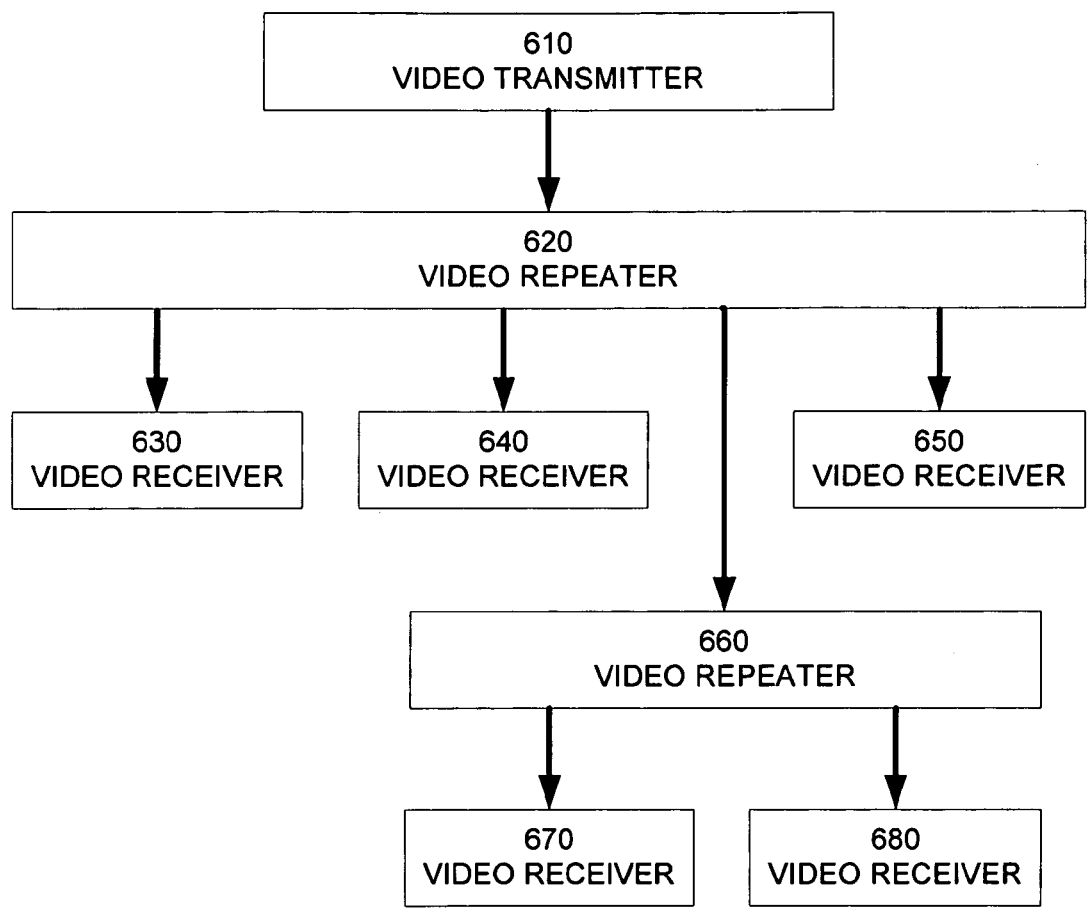
FIG.6 shows a block diagram illustrating a system incorporating an apparatus for augmenting authentication in a cryptographic system according to one embodiment of the invention.

FIG. 6 shows a block diagram illustrating a system incorporating an apparatus for augmenting authentication in a cryptographic system, according to one embodiment of the invention. Video transmitter 610 is connected to video repeater 620. Video repeater 620 is connected to video receivers 630, 640, and 650. Video repeater 620 is also connected to video repeater 660. Video repeater 660 is connected to video receivers 670 and 680.

Video transmitter 610 includes transmission unit 110. Video receivers 630, 640, 650, 670, and 680 include reception unit 120. Video repeaters 620 and 660 include reception unit 120 and transmission unit 110.

In various embodiments, any of video transmitter 610; video receivers 630, 640, 650, 670, and 680; and video repeaters 620 and 660 may include televisions, video cassette recorders, digital video disc players, computers, monitors, set top boxes, graphics cards, movie theatre equipment, etc. It is apparent that the above system may also be modified to operate with audio signals and devices as well as video signals and devices, or other forms of data and devices that use those forms of data. Obviously, the topographical orientations of devices in such systems may vary, as well as the quantity of devices within such systems.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, a method of an embodiment of the invention could be stored on machine-readable media, such as magnetic disks or optical disks, that are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and computer and/or machine readable communication media such as electrical, optical, acoustical and other forms of propagated signals (e.g., carrier waves, infrared signals, digital signals, etc.).

Although specific embodiments of the invention has been described, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for an augmented authentication unit, separate from a cryptographic system, to modify an authentication protocol of the cryptographic system comprising:
   detecting, with communication hardware of the augmented authentication unit, a nonce to be used by the authentication protocol from a communication stream;
   removing the nonce from the communication stream intercepted responsive to the detection;
   encrypting, with processing hardware of the augmented authentication unit, the nonce into an encrypted nonce based on a shared secret formed by an authenticated key exchange; and
   inserting the encrypted nonce back into the communication stream.

2. The method of claim 1, wherein the nonce is an An value generated by a High-bandwidth Digital Content Protection (HDCP) function.

3. The method of claim 1, wherein the communication stream is an Inter-Integrated Circuit (I2C) communication path.

4. The method of claim 1, wherein the authenticated key exchange is to use signed Diffie-Hellman Key Exchange.

5. A method for an augmented authentication unit, separate from a cryptographic system, to modify an authentication protocol of the cryptographic system comprising:
   detecting, with communication hardware of the augmented authentication unit, an encrypted nonce from a communication stream used by the authentication protocol;
   removing the encrypted nonce from the communication stream responsive to the detection;
   decrypting, with processing hardware of the augmented authentication unit, the encrypted nonce into an decrypted nonce based on a shared secret formed by an authenticated key exchange, wherein the decrypted nonce is to be used in the authentication protocol; and
   inserting the decrypted nonce back into the communication stream.

6. The method of claim 5, wherein the nonce is an An value generated by a High-bandwidth Digital Content Protection (HDCP) function.

7. The method of claim 5, wherein the communication stream is an Inter-Integrated Circuit (I2C) communication path.

8. The method of claim 5, wherein the authenticated key exchange is to use Diffie-Hellman Key Exchange.

9. A machine-readable storage medium having instructions stored thereon which, when executed by a machine, cause the machine to perform a method of for an augmented authentication unit, separate from a cryptographic system, to modify an authentication protocol of the cryptographic system comprising:
   detecting a nonce to be used by the authentication protocol from a communication stream;
   removing the nonce from the communication stream intercepted responsive to the detection;
   encrypting the nonce into an encrypted nonce based on a shared secret formed by an authenticated key exchange; and
   inserting the encrypted nonce back into the communication stream.

10. The machine-readable medium of claim 9, wherein the nonce is an An value generated by a High-bandwidth Digital Content Protection (HDCP) function.

11. The machine-readable medium of claim 9, wherein the communication stream is an Inter-Integrated Circuit (I2C) communication path.

12. The machine-readable medium of claim 9, wherein the authenticated key exchange is to use Diffie-Hellman Key Exchange.

13. A machine-readable storage medium having instructions stored thereon which, when executed by a machine, cause the machine to perform a method of for an augmented authentication unit, separate from a cryptographic system, to modify an authentication protocol of the cryptographic system comprising:
   detecting an encrypted nonce from a communication stream used by the authentication protocol;
   removing the encrypted nonce from the communication stream responsive to the detection;
   decrypting the encrypted nonce into an decrypted nonce based on a shared secret formed by an authenticated key exchange, wherein the decrypted nonce is to be used in the authentication protocol; and
   inserting the decrypted nonce back into the communication stream.

14. The machine-readable medium of claim 13, wherein the nonce is an An value generated by a High-bandwidth Digital Content Protection (HDCP) function.

15. The machine-readable medium of claim 13, wherein the communication stream is an Inter-Integrated Circuit (I2C) communication path.

16. The machine-readable medium of claim 13, wherein the authenticated key exchange is to use Diffie-Hellman Key Exchange.

17. An apparatus comprising:
   a first unit to provide a nonce in a communication stream during an authentication exchange phase of a cryptographic system; and
   a second unit coupled with the first unit:
      to detect the nonce from the communication stream;
      to remove the nonce from the communication stream responsive to the detection;
      to encrypt the nonce into an encrypted nonce based on a shared secret formed by an authenticated key exchange; and
      to insert the encrypted nonce back into the communication stream.

18. The apparatus of claim 17, wherein the nonce is an An value generated by a High-bandwidth Digital Content Protection (HDCP) function.

19. The apparatus of claim 17, wherein the communication stream is an Inter-Integrated Circuit (I2C) communication path.

20. The apparatus of claim 17, wherein the first unit is a High-bandwidth Digital Content Protection (HDCP) transmitter.

21. The apparatus of claim 17, wherein the authenticated key exchange is to use Diffie-Hellman Key Exchange.

22. An apparatus comprising:
  a first unit:
    to detect an encrypted nonce from a communication stream;
    to remove the encrypted nonce from the communication stream responsive to the detection;
    to decrypt the encrypted nonce into an decrypted nonce based on a shared secret formed by an authenticated key exchange; and
    to insert the decrypted nonce back into the communication stream; and
  a second unit coupled with the first unit to receive the decrypted nonce from the communication stream during an authentication exchange phase of a cryptographic system.

23. The apparatus of claim 22, wherein the nonce is an An value generated by a High-bandwidth Digital Content Protection (HDCP) function.

24. The apparatus of claim 22, wherein the communication stream is an Inter-Integrated Circuit (I2C) communication path.

25. The apparatus of claim 22, wherein the second unit is an High-bandwidth Digital Content Protection (HDCP) receiver.

26. The apparatus of claim 22, wherein the authenticated key exchange is to use Diffie-Hellman Key Exchange.

27. A system comprising:
  a transmitter device including:
    a first unit to provide a nonce in a communication stream during an authentication exchange phase of a cryptographic system; and
    a second unit coupled with the first unit:
      to detect the nonce from the communication stream;
      to remove the nonce from the communication stream responsive to the detection of the nonce;
      to encrypt the nonce into an encrypted nonce based on a shared secret formed by an authenticated key exchange; and
      to insert the encrypted nonce back into the communication stream; and
  at least one receiver device to receive data from the transmitter device, the at least one receiver device comprising:
    a third unit:
      to detect the encrypted nonce from the communication stream;
      to remove the encrypted nonce from the communication stream responsive to the detection of the encrypted nonce;
      to decrypt the encrypted nonce into an decrypted nonce based on the shared secret; and
      to insert the decrypted nonce back into the communication stream;
    and
    a fourth unit coupled with the third unit to use the nonce from the communication stream during the authentication exchange phase.

28. The system of claim 27, wherein the nonce is an An value generated by a High-bandwidth Digital Content Protection (HDCP) function.

29. The system of claim 27, wherein the communication stream is an Inter-Integrated Circuit (I2C) communication path.

30. The system of claim 27, wherein the authenticated key exchange is to use Diffie-Hellman Key Exchange between the second unit and the third unit.

* * * * *

UNITED STATES PATENT AND TRADEMARK OFFICE
CERTIFICATE OF CORRECTION

PATENT NO.        : 7,600,118 B2                                        Page 1 of 1
APPLICATION NO.   : 10/256803
DATED             : October 6, 2009
INVENTOR(S)       : Lee et al.

It is certified that error appears in the above-identified patent and that said Letters Patent is hereby corrected as shown below:

In column 10, at line 24 delete, "of"

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO.       : 7,600,118 B2                                                            Page 1 of 1
APPLICATION NO.  : 10/256803
DATED            : October 6, 2009
INVENTOR(S)      : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Fifth Day of October, 2010

David J. Kappos
*Director of the United States Patent and Trademark Office*